INVENTORS
Peter Ashurkoff &
BY William L. Drayer
W. F. Wagner
ATTORNEY

Dec. 14, 1965   P. ASHURKOFF ET AL   3,222,767
PRESS-FITTING APPARATUS HAVING A FLEXURAL MEMBER DRIVEN
BY FLUID OPERATED VIBRATORS
Filed May 20, 1963   2 Sheets-Sheet 2

INVENTORS
Peter Ashurkoff &
BY William L. Drayer
W. F. Wagner
ATTORNEY

_____

United States Patent Office 3,222,767
Patented Dec. 14, 1965

_____

3,222,767
PRESS-FITTING APPARATUS HAVING A FLEXURAL MEMBER DRIVEN BY FLUID OPERATED VIBRATORS
Peter Ashurkoff, Grosse Pointe Farms, and William L. Drayer, Warren, Mich., assignors to General Motors Corporation, Detroit, Mich., a corporation of Delaware
Filed May 20, 1963, Ser. No. 281,621
4 Claims. (Cl. 29—252)

This invention relates to an apparatus which facilitates the joining of two members and more particularly to an apparatus that utilizes vibratory energy for press-fitting two members together.

In a co-pending patent application, Serial Number 225,036, De Wilde, filed September 20, 1962, and assigned to the assignee of this invention, a press-fitting apparatus is shown that includes a flexural member in the form of a disc which is vibrated during a pressing operation. The disc is coupled to one of the two members being press-fitted and supplies vibratory energy thereto so as to facilitate the joining of the members. An apparatus of this sort has been found to decrease the time and external force necessary for mating the two members and more importantly has eliminated inner wall galling frequently caused by the slip-stick movement of the inserting member during a conventional press-fitting operation. However, one difficulty found with the above-described apparatus is that in addition to using vibratory forces for fitting one of the members into the other, an external force-applier in the form of a hydraulic press or the like must be used.

Accordingly, the principal object of this invention is to provide an improved press-fitting apparatus.

Another object of this invention is to provide an apparatus for press-fitting two members together which utilizes vibratory energy alone without the addition of any external ram force for accomplishing the mating.

Another object of this invention is to provide an apparatus for press-fitting two members together that has a flexural member vibrated in a standing-wave form and has an elastic means for taking a reciprocating force from an antinode point on the flexural member and transforming it into a unidirectional force for inserting one member into the other.

The above objects and others are accomplished with an apparatus comprising an elongated flexural beam member to which one or more vibrators are mounted for driving the flexural member at the resonant frequency thereof so as to set up a standing-wave movement. An adapter assembly for holding one of the two members being press-fitted is connected to the flexural member at an antinode point thereof. The adapter assembly includes an elongated bar having sufficient elasticity to permit the flexural member to be displaced relative to the member being inserted when moving in a direction opposite to that for insertion so as to efficiently utilize the vibratory energy during the press-fitting operation.

A more complete understanding of this invention can be derived from the following detailed description taken in conjunction with the drawings in which.

Figure 1:
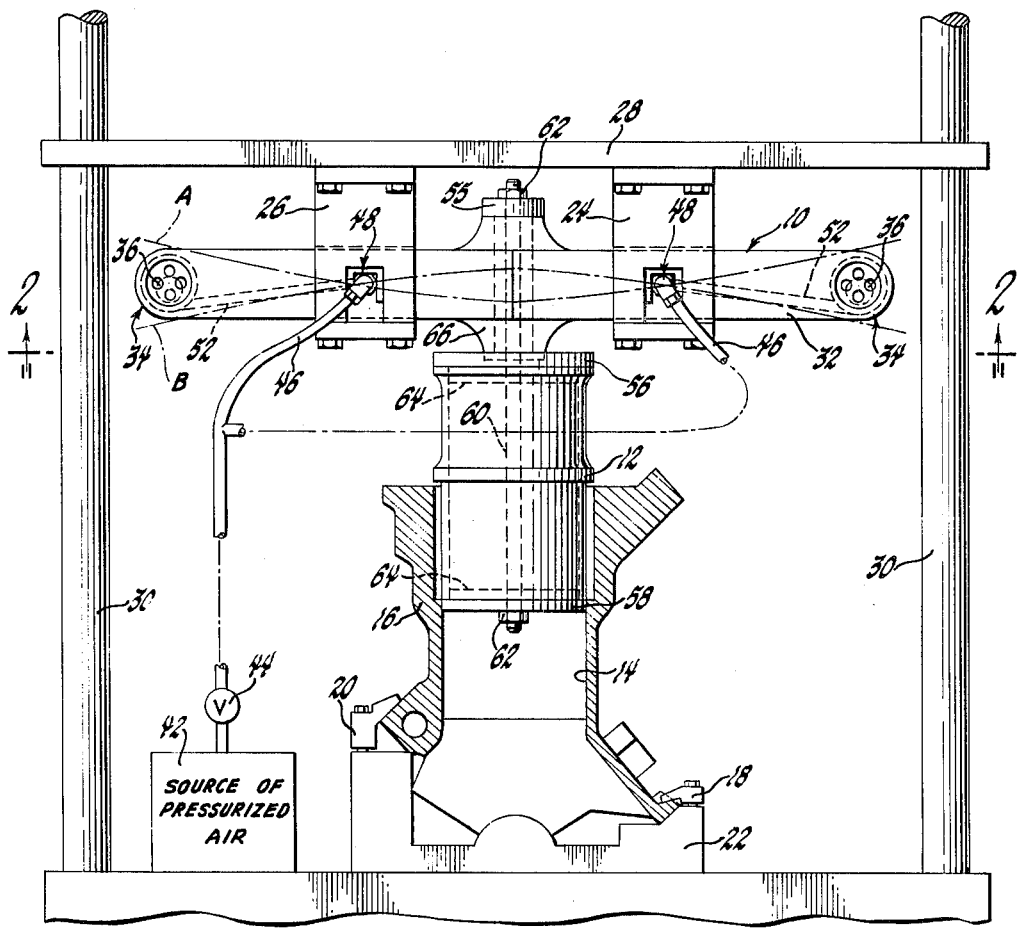
FIGURE 1 is an elevation view showing a vibratory apparatus made in accordance with the invention and press-fitting a cylinder liner into the piston bore of an engine block.

Referring now to FIGURE 1 of the drawings, for illustrative purposes the vibratory apparatus made in accordance with the invention and generally indicated by the numeral 10 is shown to be utilized for press-fitting to cylinder liner 12 into the cylinder opening 14 of an internal combustion engine block 16. The engine block is rigidly secured through suitable hold-down clamps 18 and 20 to a base 22 which properly maintains the axis of the cylinder in a vertical position for receiving the liner. The vibratory apparatus is supported by a pair of depending arms 24 and 26 which are secured to a support plate 28 that is slidably supported along vertical guide columns 30 during the press-fitting operation. Although not shown, means are provided for raising or lowering the plate and the associated vibratory apparatus for purposes of positioning the liner into the cylinder or removing the vibratory apparatus once the liner has been inserted into the engine block, as will be explained hereinafter.

At this juncture, it should be noted that although the vibratory apparatus made in accordance with the invention is shown being used for press-fitting a cylinder liner into an engine block, it should be apparent to those skilled in the art that it can be utilized for joining together any other two members where a press-fit is required. Moreover, although this apparatus is shown being supported by a construction which permits it to be raised and lowered along vertical guide columns, this would only be necessary in the instances where the articles being assembled and therefore the associated vibratory apparatus, are of such weight and size that an operator could not manually manipulate the apparatus. Hence, where this is not the case, the arms can be connected directly to a handle extending between the arms so that the vibratory apparatus may be held by the operator during the press-fitting operation.

Figure 2:
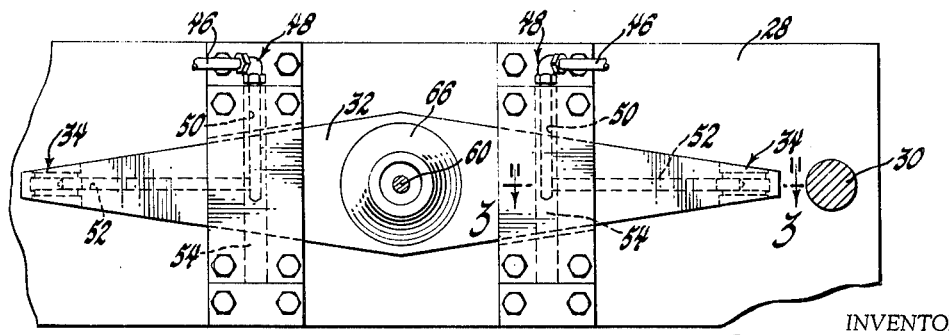
FIGURE 2 is a view taken on lines 2—2 of FIGURE 1.
Figure 3:
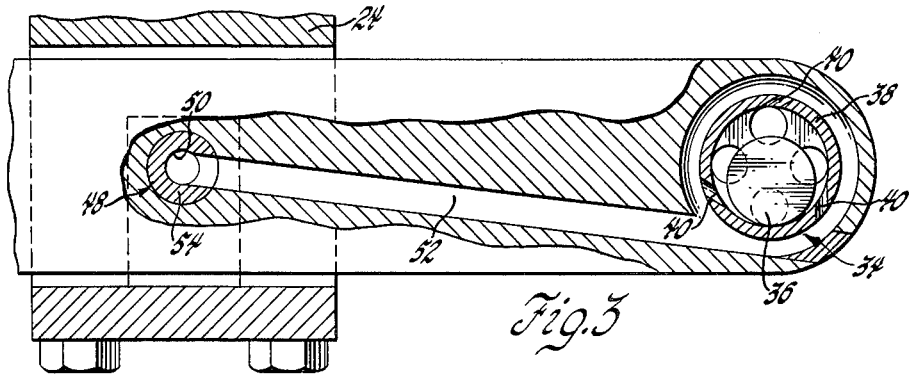
FIGURE 3 is an enlarged view partially in section showing the details of the vibrator and taken on lines 3—3 of FIGURE 2.

The vibratory apparatus comprises a steel flexural member 32 made in the form of an elongated beam which as seen in the elevation view of FIG. 1, is of a uniform height while in plan view as seen in FIGURE 2, it has a maximum width at the center and tapers to a minimum width at the end portions. An air-driven vibrator generally indicated by the numeral 34 is provided in each end of the flexural member and, as seen in FIG. 3, comprises a circular mass or roller 36 located on a fixed round track 38 that is formed with a plurality of tangentially directed air nozzles 40 which serve to direct a stream of compressed air against the periphery of the roller to drive the latter around the track in an orbital fashion to produce a rotating force vector as taught in the aforementioned copending patent application to De Wilde. The compressed air is directed to each of the vibrators from a source 42 which is under the control of a valve 44. Air travels through the valve to the air lines 46 which lead to air connections 48 and passages 50, 52 that communicate with the vibrators.

It is significant that in this particular apparatus each air connection with the flexural member is at a point of no movement or nodal point so that the flexural member does not impart any movement to the air lines while the vibrators are operating. Additionally, each air connection comprises a shaft 54 which serves as a pivot member supported in a manner which permits the flexural member to alternately bend, as indicated by the deflection curves A and B in FIGURE 1.

Figure 4:
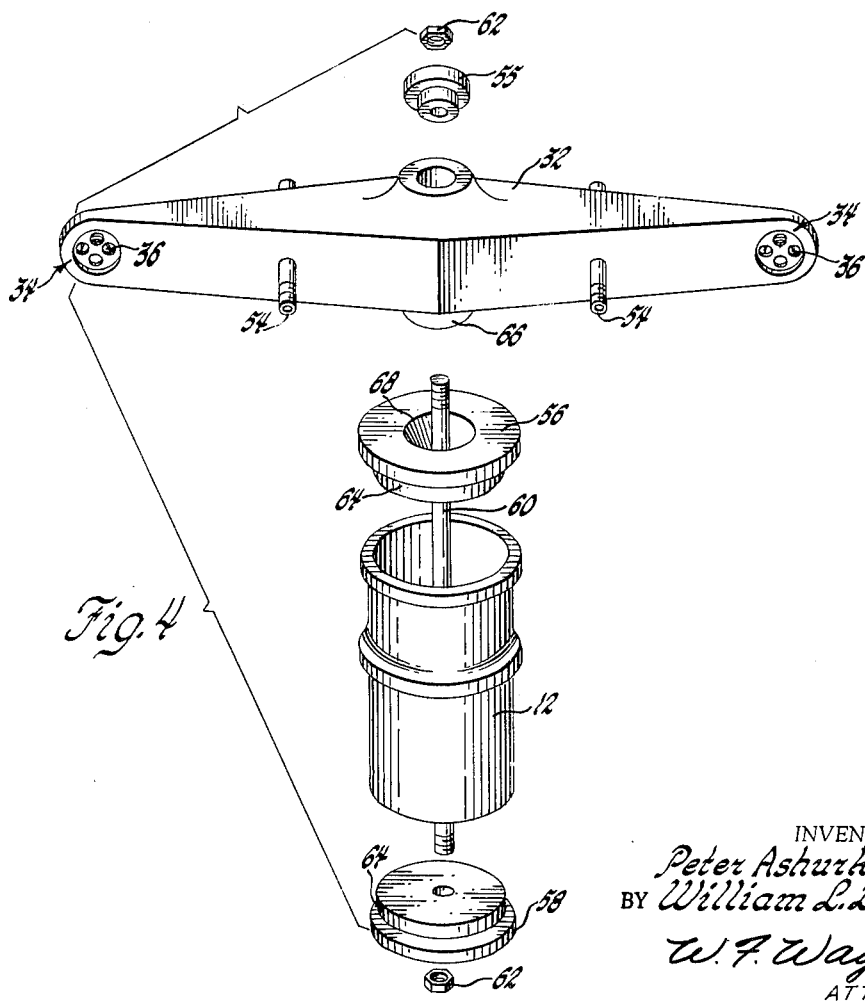
FIGURE 4 is an exploded view showing the vibratory apparatus and the adapter utilized for connecting a cylinder liner to the former.

An adapter assembly is connected to the flexural member at the center thereof and includes a cap member 55 and a pair of disc-type support members 56 and 58, the latter of which are adapted to be respectively fitted on the upper and lower end of the liner. An elongated bolt or elastic member 60 passes through appropriate bores centrally formed in the cap member and the respective support members, and secures the liner to the flexural member by means of the nuts 62 which are threadedly fitted opposite ends of the bolt. As best seen in FIG. 4, each of the support members are formed with pilot portions 64 which have an outer diameter substantially the same as the inner diameter of the liner so as to prevent any lateral movement of one member relative to the other when assembled thereto. Additionally, a projection 66 rigidly formed with the center of the flexural member is accommodated within a suitable bore 68 in the top surface of the support member 56 so as to maintain the liner in a fixed position when the latter is assembled to the vibratory apparatus.

The operation of the vibratory apparatus is as follows: Assuming it is desired to insert the liner 12 into the cylinder opening in the engine block 16, initially the operator would raise the support plate 28 and the associated vibratory apparatus 10 into an elevated position. Thereafter, the adapter assembly would be used for attaching the liner to the apparatus by initially placing the support members 56 and 58 on the upper and lower portion of the liner and then, assuming the bolt 60 is already connected with the cap member 55 and extended through the flexural member, slide the composite on the lower portion of the bolt and clamp it to the flexural member by threading the nut 62 on the lower portion of the bolt. It should be understood that this method of attaching the liner to the vibratory apparatus is for illustrative purposes only, and it could be done more quickly through a clamping arrangement which would not necessitate a threading of a nut onto the bolt. This, of course, should be apparent to one skilled in the art and therefore a detailed description as to other methods for accomplishing this result is not deemed necessary.

Once the liner has been attached to the vibratory apparatus, the latter can be lowered with the lead end of the liner being directed into the cylinder opening as seen in FIGURE 1. This is accomplished simply by positioning the engine block in the proper location with respect to the vibratory apparatus and lowering the support plate along the guide columns 30 so that the lead end of the liner is inserted into the cylinder. The vibrators 34 are then energized by opening the valve 44 and directing compressed air thereto so as to drive the roller 36 in each vibrator in an orbiting fashion as explained earlier. The valve is manually regulated to supply sufficient air to the vibrators to drive them at a frequency equal to the resonant frequency of the flexural member so as to set up a standing-wave movement of the latter as shown by the deflection curves in FIGURE 1. Thus, the center of the flexural member has an up-and-down movement which acts against the liner in a manner to be described in detail below. During such vibratory movement of the flexural member, the liner moves quickly into the piston bore solely under the weight of the vibratory apparatus without requiring any external force to be applied to the latter.

In order to vibrate the flexural member as described above, it should be noted that the rollers in the vibrators are driven in a counter-rotating manner. In other words, as viewed in FIG. 1, the left-hand vibrator has its roller moving in a clockwise direction while the right-hand vibrator has its roller moving in a counterclockwise direction. Thus, all forces acting in directions other than along a vertical line passing through the center of each vibrator are cancelled so that each end portion of the flexural member is subjected to a reciprocating force in a vertical direction. These forces act in a vertical plane passing through the longitudinal center of the flexural member and in the same direction so that both ends of the flexural member are alternately subjected to upward forces to bend the bar in a manner as seen by the deflection curve A, and downward forces to bend the bar as seen by the other deflection curve B. Hence, at a point where two deflection curves intersect which in this case is at the air connection 48, we have a nodal point or point of no movement, while the points on the flexural member where the vibrators are mounted and also the center of the flexural member we have points of maximum deflection or antinodal points.

For most efficient operation the vibrators should be operated at a frequency equal to the resonant frequency of the flexural member so as to set up a standing-wave movement having nodal and antinodal points. As described above, during such operation the liner will be driven into the cylinder without requiring any external downward force being applied to the vibratory apparatus. In other words, no force is required other than that generated by the vibrators for pushing the liner into the accommodating bore. At first glance, it would appear that inasmuch as the liner is connected to the center of the flexural member by the bolt 60, that any inserting movement caused by downward deflection of the flexural member would be offset by the upward movement thereof. This, however, is not the case since the bolt acts as a spring so that upward movement of the flexural member causes a slight elongation of the bolt without removing the liner. In order to achieve this phenomena the spring constant of the bolt must be related to the frictional forces retaining the liner in the bore. That is, the frictional force must be greater than the force necessary to cause an elastic stretching of the bolt without exceeding the elastic limit of the latter.

In a test press-fitting operation where the interference fit between the liner and the cylinder bore was five-thousands of an inch (0.005″), it was found that a hydraulic ram force of approximately 8000 pounds was necessary to insert the liner. To insert the same liner with the vibratory apparatus made in accordance with the invention, no external force was required and the job was done in less than five seconds without experiencing any cylinder wall galling or chatter frequently attending a press-fitting operation of this sort. It is interesting to note that during the same test it was possible to raise the entire engine block, which weighed approximately 400 pounds, onto the liner when the vibratory apparatus was held in a fixed position on the guide columns. This was accomplished simply by energizing the vibrators, and although not completely understood, it is thought that the lifting power of the device can be attributed to the use of the elastic member connecting the liner to the vibratory apparatus.

In the test referred to above, the flexural member had a height of 2.0 inches and a maximum width at the center of 4.0 inches which tapered to 0.76 inch at each end. The vibrators were spaced 21.0 inches from centers and rated at 1000 pounds at 1000 cycles per second. The liner had an outer diameter of 4.028 inches and a length of 6.20 inches. The bolt or elastic member connecting the flexural member with the liner had a diameter of 0.25 inch and an overall length of approximately 13.30 inches. This bolt had a spring constant ($k$) equal to 100,000 lb./in. which was calculated by using the formula $$K = \frac{EA}{l}$$

where $E$ is the modulus of elasticity, $A$ is the cross-sectional area, and $l$ is the length of the bolt.

As should be apparent from the above, the use of an elastic bolt is one of the significant features of this invention. As explained above, by providing a spring-type connection between the flexural member and the liner we can utilize the down stroke of the antinode point of the beam to strike the liner and position it into the block. However, on the up-stroke the bolt stretches as a spring and the beam will momentarily leave the liner without withdrawing the latter from the block. Hence, even though a reciprocating force is being generated by the flexural member and a substantially rigid connection is provided between the liner and the flexural member, a resonant unidirectional force is realized which permits the vibratory apparatus to insert the liner without the addition of any external force.

Finally, it should be noted that during a press-fitting operation, the use of an elastic connection between the vibratory apparatus and the member being inserted is not absolutely necessary. In other words and as seen in FIGURE 1, the projection 66 can be placed on the support member 56 without requiring any other parts of the adapter assembly, and upon energization of the vibrators 34, the liner 12 will be inserted into the opening 14. In this case, however, a noticeable hammering effect will occur between the projection and support member and some small downward force will be necessary on the vibratory apparatus to accomplish full insertion.

Although one embodiment of this invention has been shown, it should be understood that various changes can be incorporated in the vibratory device without departing from the spirit of the invention. Therefore, the inventor does not wish to be limited except by the scope of the appended claims.

What is claimed is:

1. A vibratory apparatus for press-fitting two members together where one of the members has an opening and the other is adapted to be inserted into the opening, comprising an elongated beam type flexural member having the opposite ends thereof adapted to vibrate freely and located at antinodal points, first means for supporting said flexural member at the nodal points thereof with the longitudinal axis of the flexural member substantially normal to the direction of insertion, second means adapted to couple one of said two members with said flexural member at an antinodal point thereof, and vibrator means operatively associated with each end of said flexural member for generating resonant standing-wave vibrations in the latter to facilitate the mating engagement of the two members.

2. An apparatus for press-fitting two members together where one of the members has an opening and the other is adapted to be inserted into the opening, comprising an elongated beam-type flexural member, a fluid driven vibrator connected to each end of said flexural member for driving the latter so as to set up a resonant standing-wave movement of the flexural member along an axis normal to the direction of insertion, each end of said flexural member adapted to vibrate freely and located at an antinodal point, means for directing compressed air to said vibrators at a controlled rate, means connected to said flexural member at the nodal points thereof for guiding said flexural member during the press-fitting operation, and an adapter assembly located at an antinodal point of said flexural member and engaging one of said two members being press-fitted.

3. An apparatus for press-fitting two members together where one of the members has an opening and the other is adapted to be inserted into the opening, comprising an elongated beam-type flexural member, a fluid driven vibrator mounted in each end of said flexural member for driving the latter at the resonant frequency thereof so as to set up a standing-wave movement of the flexural member in a plane parallel to the direction of insertion, each end of said flexural member adapted to vibrate freely and located at an antinodal point, passage means formed in said flexural member for directing compressed air to said vibrators, a source of compressed air connected to said passage means, means for supporting said flexural member at the nodal points thereof, means connected to said support means for guiding said flexural member during the press-fitting operation, an adapter assembly having an elastic member for holding one of said two members being press-fitted, said elastic member being connected to said flexural member at an antinode point thereof and having sufficient elasticity to permit the flexural member at said latter-menioned point to be displaced relative to said one of said two members when moving in a direction opposite to that for insertion.

4. An apparatus for press-fitting two members together where one of the members has an opening and the other is adapted to be inserted into the opening, comprising an elongated beam-type flexural member, a fluid driven vibrator mounted in each end of said flexural member for driving the latter at the resonant frequency thereof so as to set up a standing-wave movement of the flexural member in a plane parallel to the direction of insertion, passage means formed in said flexural member for directing compressed air to said vibrators, a source of compressed air connected to said passage means at the nodal points of the flexural member, a pair of arms for supporting said flexural member at the nodal points thereof, a plate supported for slidable movement in the direction of insertion and connected to said support arms for guiding said flexural member during the press-fitting operation, an adapter assembly including an elastic member for holding one of said two members being press-fitted, said elastic member being connected to said flexural member at an antinode point thereof and having sufficient elasticity to permit the flexural member at said latter-mentioned point to be displaced relative to said one of said two members when moving in a direction opposite to that for insertion.

References Cited by the Examiner

UNITED STATES PATENTS

| 2,144,173 | 1/1939 | Wurzbach et al. | 29—252 X |
| 2,420,793 | 5/1947 | O'Connor | 29—252 X |
| 2,500,340 | 3/1950 | Boulton | 29—255 X |
| 3,016,604 | 1/1962 | Castelvecchi | 29—255 |

WILLIAM FELDMAN, *Primary Examiner.*

MYRON C. KRUSE, M. HENSON WOOD, JR.,
*Examiners.*